May 13, 1958

W. F. MIRON 2,834,041

FISH HOLDING DEVICE

Filed Sept. 13, 1956

INVENTOR
WALTER F. MIRON

BY

ATTORNEY

United States Patent Office 2,834,041
Patented May 13, 1958

2,834,041

FISH HOLDING DEVICE

Walter F. Miron, Detroit, Mich.

Application September 13, 1956, Serial No. 609,612

1 Claim. (Cl. 17—8)

The present invention relates to improvements in fish holders, and more particularly to a fish holder device adapted to be used for holding a fish in position while removing the scales.

One object is to provide a fish holding device having an attenuated rod or the like capable of being inserted through the fish's mouth and along the backbone of the fish to hold the fish distended and substantially rigid while placed in position on a table or support during scaling.

Another object is to provide a fish holder of the above-mentioned type having a handle to be used in manipulating the holder and enable the same to be inserted quickly and easily into the body of the fish with a minimum amount of effort on the part of the user.

Another object is to provide a fish holding device having means for clamping the forward portion of the fish in the area of the mouth and head to the handle so that the same may be held in one hand to retain the fish in an extended position while the sides are being scraped with a knife or the like to de-scale the fish.

Another object is to provide a fish holding device of the above-mentioned type in which the handle comprises a spring jaw type clamp having jaw portions adapted to engage the head and mouth of the fish being cleaned so that considerable force can be exerted on the scaling knife when de-scaling the fish.

Another object is to provide a fish holding device which is adapted to be formed of a single piece of wire bent to form a clamping handle and provided with an attenuated portion adapted to be inserted in the fish to hold the same rigid while a scaling knife is moved over the sides of the fish in the direction of the handle to remove the scales.

Another object is to provide a fish holding device of the above-mentioned type in which the device is formed of spring wire and the handle is formed with a spring loop at one end to place the jaw portions under sufficient tension to frictionally grip the mouth and head of the fish therebetween.

Figure 1:
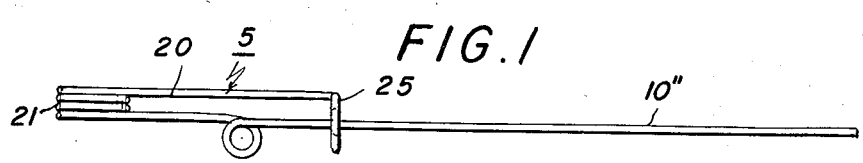
Figure 2:
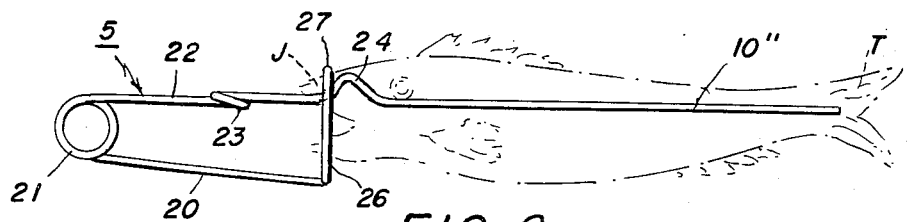

Other objects and advantages of the invention will become apparent during the course of the following description of the accompanying drawing, wherein:

Figure 1 is a top elevational view of the invention showing a fish holding device which is formed of a single piece of spring wire, and Figure 2 is a side elevational view of the fish holding device shown in Figure 1, showing the manner in which the attenuated rod is inserted throughout the entire length of the fish body with the upper fish jaw clamped between the spring wire handle jaws.

In the drawing, attention is first directed to Figures 1 and 2 wherein there is shown one embodiment of the invention.

In the embodiment of the invention shown in Figures 1 and 2 the fish holding device is formed from a single piece of spring wire and includes a handle 5 formed of a piece of wire 20 coiled as at 21 and extending in another handle section 22 substantially parallel to the handle section 20. The handle section 22 is coiled as at 23 to extend in a direction in a plane at right angles to the plane of the coil 21.

The attenuated rod 10" is formed integral with the handle section 22 and coiled loop 23. The rod 10" is crimped as at 24 to provide an upwardly projecting portion (Figure 2) adapted to engage within the mouth of the fish when the attenuated rod is inserted in the fish body F so as to engage the roof of the fish jaw J. The handle section 20 is bent as at 25 and is further bent to provide a looped portion 26 extending upwardly and around the handle section 22 to form a gripping jaw portion 27. The gripping jaw portion 27 is adapted to engage the outer surface of the fish jaw J on one side of the crimp 24 adjacent the handle to securely grip the upper jaw of the fish J therebetween.

It will thus be seen that when the attenuated rod 10" is inserted in the fish to extend along the backbone from the jaw J to the tail T that the handle members 20 and 22 may be grasped to separate the jaw portions of the device so that the jaw of the fish J may be gripped and frictionally held between the crimped jaw portion 24 and the bent jaw portion 27.

It is to be understood that the form of the invention herewith shown and described is to be taken as a preferred embodiment thereof and that the various changes in the shape, size and arrangement of parts may be resorted to without departing from the spirit of the invention or the scope of the subjoined claim.

What I claim is:

In a device for holding a fish extended for cleaning, comprising a single piece of wire coiled to form a spring member having the ends extending approximately parallel a substantial distance to form a handle portion, one of said ends being extended to form an attenuated fish holding device adapted to be inserted in the fish to extend along the backbone from the head to the tail thereof, said extended portion being provided with a crimped area adapted to engage in the roof of the mouth of the fish to form a gripping jaw portion, and the other extended portion of said handle being bent in a direction approximately at right angles thereto with its free end provided with a return bent portion extending around the other handle section in proximity to said crimped portion to yieldingly urge the head of the fish into contactual engagement with said crimped portion and frictionally hold the head of the fish in position on said attenuated portion, and a coiled loop on one of said handle sections intermediate the end of the handle and said crimped portion adapted to form a thumb engaging area to permit separation of the gripping jaw portions by yieldingly exerting pressure on said handle sections whereby said jaw portions will separate.

References Cited in the file of this patent

UNITED STATES PATENTS

| | | |
|---|---|---|
| 1,321,594 | Burlingame | Nov. 11, 1919 |
| 2,298,580 | Miron | Oct. 13, 1942 |
| 2,587,007 | Southward et al. | Feb. 26, 1952 |
| 2,607,096 | Sousa | Aug. 19, 1952 |

FOREIGN PATENTS

| | | |
|---|---|---|
| 45,794 | Sweden | Sept. 20, 1919 |